US005612126A

United States Patent [19]

Cross et al.

[11] Patent Number: 5,612,126

[45] Date of Patent: Mar. 18, 1997

[54] STIFF FABRIC AND METHOD OF FORMING THE STIFF FABRIC

[75] Inventors: David M. Cross, Westport, Conn.; Manfred H. K. Hueneke, Graham, N.C.; Ronald A. Farris, Gibsonville, N.C.; Bobby L. McConnell, Greensboro, N.C.; Robert M. Newman, Thomasville, N.C.

[73] Assignee: Burlington Industries, Inc., Greensboro, N.C.

[21] Appl. No.: 182,986

[22] Filed: Jan. 19, 1994

[51] Int. Cl.$^{6}$ .............................. B32B 3/10; B32B 7/00; D03D 3/00

[52] U.S. Cl. .......................... 442/227; 428/138; 428/141; 428/196; 427/389.9

[58] Field of Search .................................... 428/138, 141, 428/196, 226, 252, 265, 315.5, 516, 262, 263, 269, 289; 156/78, 244.25; 264/DIG. 8; 427/180, 206, 389.9, 402, 435

[56] References Cited

U.S. PATENT DOCUMENTS

| | | | |
|---|---|---|---|
| 3,663,329 | 5/1972 | Rossmann | 156/148 |
| 3,714,078 | 1/1973 | Gordon et al. | 428/262 |
| 3,946,788 | 3/1976 | Van Muyen | 160/22 |
| 4,181,769 | 1/1980 | Plamondon et al. | 428/262 |
| 4,264,659 | 4/1981 | Pattenden | 428/138 |
| 4,682,480 | 7/1987 | Schnegg et al. | 66/192 |
| 5,034,266 | 7/1991 | Kinlaw et al. | 428/262 |
| 5,159,011 | 10/1992 | Rau et al. | 524/562 |
| 5,436,064 | 7/1995 | Schnegg et al. | 428/234 |

FOREIGN PATENT DOCUMENTS 0523930 1/1993 European Pat. Off. .

OTHER PUBLICATIONS

Webster's Ninth New Collegiate Dictionary, 1990, p. 676.

*Primary Examiner*—Thurman K. Page
*Assistant Examiner*—Kathryne E. Shelborne
*Attorney, Agent, or Firm*—Nixon & Vanderhye

[57] ABSTRACT

A stiff fabric comprises a woven synthetic fabric coated with a latex compound aerated to provide a weight upon application to the fabric of between 0.63–0.89 gms./ml. The compound is pressed into the fabric by a knife blade having a rounded convex lower edge whereby the compound applied to one side of the fabric passes into the interstices but remains substantially clear of the face side. The compound is cured on the fabric in an oven at approximately 149° C. for 45–60 seconds.

18 Claims, 3 Drawing Sheets

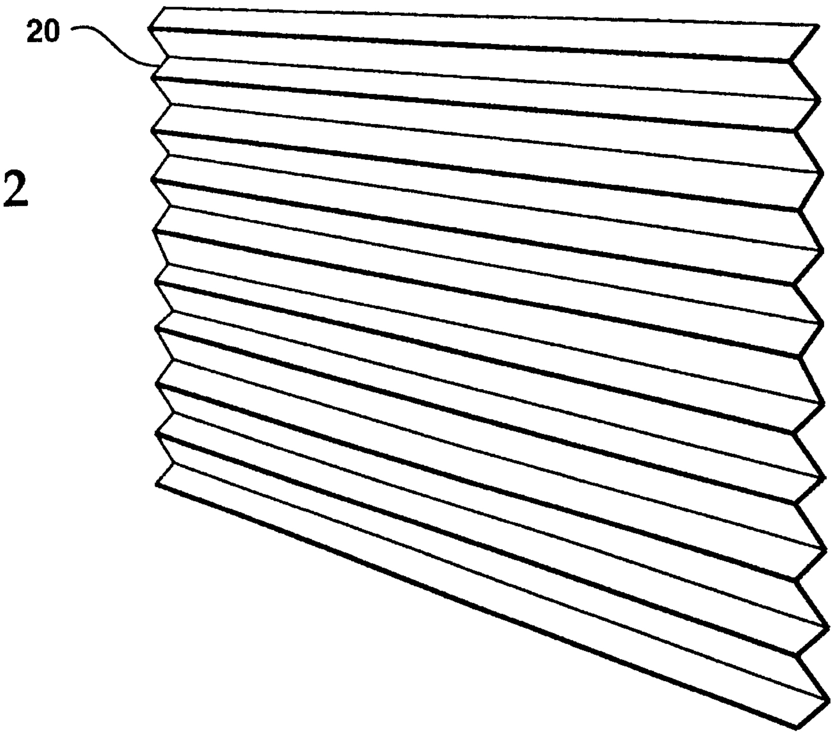
Fig. 2
Fig. 3
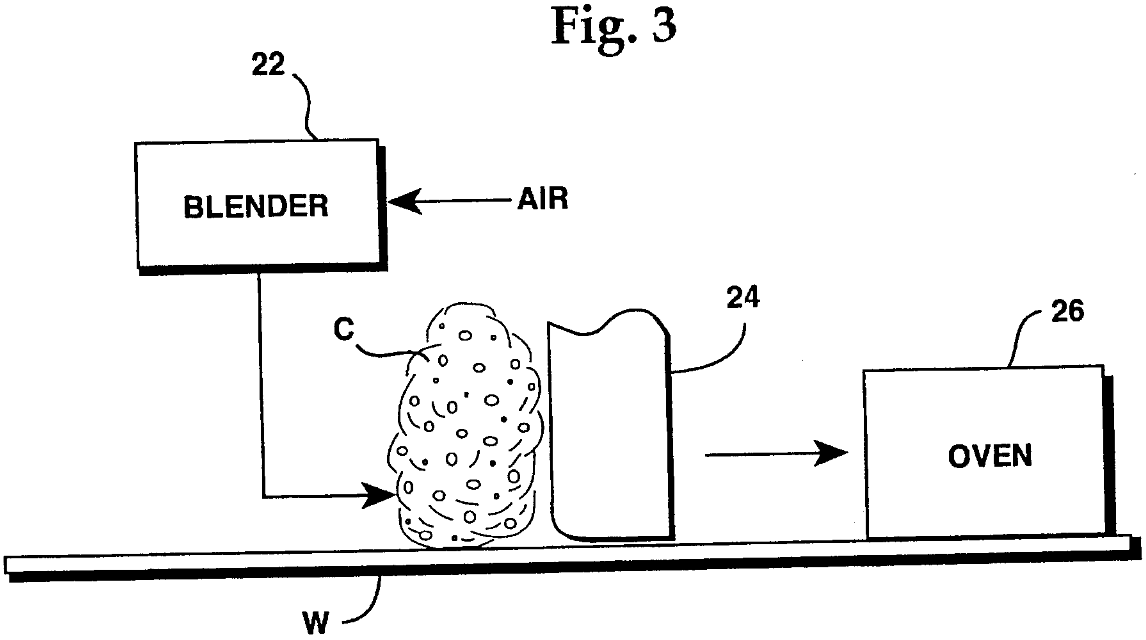

STIFF FABRIC AND METHOD OF FORMING THE STIFF FABRIC

TECHNICAL FIELD

The present invention relates to a stiff fabric for various uses, including, for example, slats or vanes forming vertical blinds, pleated shades for window treatments, coverings for the housings for vertical blinds and pleated shades, automobile interior parts, furniture panels, large and small wall panels, partitions and the like. The present invention also relates to methods of making the stiff fabric.

BACKGROUND

Fabrics, of course, are and have been used as coverings for a large variety of articles. Because of the flexibility of fabric materials, they are frequently adhered, for example, by adhesive, to an underlying rigid substrate, such as wood or plasterboard, which affords rigidity to the fabric. The ease of manufacture of fabrics in many different colors, textures, patterns and raw materials lends their use in a wide variety of applications. The flexible nature of fabrics, however, frequently is a detriment to their application and end use. This will become apparent from the following discussion of the use of fabrics in window treatments and coverings, for example, wall panels, representative of the ofttimes desirable but sometimes disadvantageous flexibility of the fabrics.

Window treatments are conventionally categorized as soft and hard treatments. For example, soft window treatments might include draperies, curtains and the like for windows or walls where the fabric forming the draperies or curtains is typically decorative and highly flexible. That is, they do not have a stiffness attributable to the fabric per se such that the fabric may have a self-supporting shape. Hard window treatments, on the other hand, may include blinds, both vertical and horizontal, including mini-blinds as well as pleated shades. The vertical blind segment of the window treatment market has grown rapidly, much to the detriment of the soft window treatment market. That is to say, the materials normally employed in the hard window treatment market from which vertical and horizontal blinds are made, for example, might comprise relatively inflexible plastic material, such as PVC, or aluminum, shaped to have a degree of stiffness or rigidity. Very little of the hard window treatment market includes fabric materials, although certain vertical blinds have previously been formed of treated, non-woven, as well as woven, fabrics. For example, there has been previously provided a stitch-through drapery fabric which may have various surface effects, ranging from casements to textures and which has been treated with resins or a polymer to achieve a stiff, self-supporting slat for vertical blinds. However, the treatment is a separate step, not part of the fabric formation and is thus limited to the addition of further materials to the fabric beyond those necessary to make it.

Also, there has been increasingly a demand for hard window treatments having a more elegant drapery look. Such fabrics have to be finished in such a way that they have sufficient stiffness to make them suitable for such window coverings. The finishing processes required for this purpose are difficult, lengthy and expensive. The physical properties of the resulting fabrics are not always satisfactory because high humidity and heat, as typically occurs at a window, cause a variation from the predetermined finished shape. For example, vertical slats or vanes formed of finished fabric materials will sometimes cup-in, i.e., form a non-controllable convex or concave surface, rather than retain a flat surface configuration, as desired. Alternately, original cup-shaped slats may become flat or obtain other shapes upon application of heat and/or humidity. Loss of definition has been found to be especially true with woven fabrics made mostly with rayon wefts.

Fabric coverings for wall panels is another example of the undesirable flexibility of fabric for certain applications, although other attributes of fabrics, such as ready and inexpensive manufacture, wide variations in color, patterns, texture, etc., make their use highly desirable as wall panels. For example, fabric coated wallpaper is relatively difficult to apply to a wall due in no small part to the flexibility of the fabric itself. Usually, a professional wallpaper hanger is required. Flexible fabrics are also difficult to cut to the required size and shape. Consequently, the oftentimes highly desirable characteristic of flexibility is frequently detrimental to the use of fabrics in certain applications. Thus, there has developed a need for a stiff fabric which obtains and retains during use a predetermined stiffness but which does not require further treatments such as the application of additional materials to the fabric to obtain and retain the stiffness.

In prior application Ser. No. 111,521, filed Aug. 25, 1993, now U.S. Pat. No. 5,436,064, there is disclosed a stiff fabric composite formed of a non-woven or woven fabric having a substrate comprised of synthetic fibers or blends of fibers rendering the substrate thermally formable or thermobondable to impart stiffness to the resulting fabric. Such stiff fabric composites retain the appearance of, and resemblance to, woven fabrics yet have stiffness characteristics rendering them useful in the applications noted above. These composites, however, require, apart from the cost of the two materials themselves, additional treatments. For example, needlepunching the substrate to the fabric and carefully controlled heat treatment of the composite material increase the costs of providing such stiff fabric composite. While the stiff fabric composite of that invention is eminently suitable for the above-noted applications, there is also a need for a reduced cost stiff fabric suitable for those purposes and which would have a mass marketing appeal.

DISCLOSURE OF THE INVENTION

According to the present invention, there is provided a fabric, preferably a woven fabric, which is sufficiently stiff for use in the above-noted applications, and which does not require the use of a substrate to impart stiffening characteristics to the fabric as in the prior invention, also noted above. To accomplish this, a woven fabric suitable for use, for example, as vertical blinds, pleated shades, or other types of window treatments, is coated on one side with a latex compound which has been aerated or foamed prior to application of the compound to the fabric. This compound has previously been applied to ticking to provide it with a finish. The compound as applied to the prior ticking, however, was very substantially aerated to provide a soft hand and additional stability, rather than for purposes of attributing stiffness characteristics to the ticking. Consequently, the coating applied to the ticking was much lighter and was run at a different speed to effect curing of the coating. By only marginally aerating or foaming the latex compound, a compound of a weight and other characteristics which will afford stiffening characteristics to the fabric is achieved.

The stiff fabric of the present invention thus comprises a woven fabric having a latex coating on one side which passes into the interstices of the fabric but which remains on the surface of the yarns within and on one side only of the fabric. The coating does not coat the opposite or face side of the fabric. The weight of the aerated foamed latex compound lies within a range of 0.63–0.89 gms./ml. and preferably is about 0.80 gms./ml. A woven synthetic fabric is provided, preferably having a pick range between 20–40 picks or weft threads per inch (8–16 picks per cm.) and a weight range from 0.400 to 0.650 lbs./lin. yd. (87.5 $g/m^2$ to 142 $g/m^2$) measured at a width of 90 inches (228.6 cm.) uncoated with the latex compound. The stiffness of the resulting fabric when coated with the latex compound is such that a flat piece of the fabric 3.5 inches (8.89 cm.) wide, cantilevered in a horizontal direction 5 inches (12.7 cm.) from a support has a droop at its distal end within a range of 3 to 4 inches (7.62–10.16 cm.).

To form the stiff fabric, a woven fabric of synthetic material in web form is passed below a coater. The latex compound is pumped in liquid form to a blender where the aeration takes place, the aerated compound being subsequently applied to the coater. The coater coats the compound on one side of the woven synthetic fabric as it passes below the knife blade. The aerated compound is applied just behind the knife to form a bank of foam. This knife has a lower convex rounded edge set in relation to a horizontal plane containing the web a distance of 0.02 to –0.06 inches (0.05 to –0.15 cm.) relative to the horizontal plane. Preferably, the blade edge is set at about –0.042 inch (–0.11 cm.) relative to the horizontal plane such that the web is slightly deflected as it passes below the blade. In this manner, the coating compound is pressed into the interstices of the synthetic woven fabric and about the warp and filling yarns. However, the compound does not pass through the fabric whereby the opposite uncoated face remains substantially free of the compound.

The fabric stiffness is such that it is substantially unaffected by humidity or heat. For example, when the fabric is formed into vertical blinds, excessive cupping of the blinds responsive to heat and/or humidity does not occur. Additionally, the fabric has an enhanced resistance to fraying and may be used with woven synthetic fabrics, for example, of the jacquard-type, wherein decorative patterns may be provided in the resulting product.

In a preferred embodiment according to the present invention, there is provided a stiff fabric comprising a woven fabric formed of a synthetic material, a latex compound applied to one side of the fabric, the latex compound being foamed with air when applied to the fabric and imparting a predetermined stiffness to the fabric, the weight of the foamed latex compound, upon application to the fabric, lying within a range of 0.63–0.89 gms./ml.

In a further preferred embodiment according to the present invention, there is provided a stiff fabric comprising a woven fabric formed of a synthetic material, a latex compound applied to one side of the fabric, the latex compound being treated upon application to the fabric to provide a fabric of predetermined stiffness such that a flat piece of the fabric 3.5 inches (8.89 cm.) wide cantilevered in a horizontal direction 5 inches (12.7 cm.) from a support has a droop at its distal end within a range of 3–4 inches (7.62–10.16 cm.).

In a still further preferred embodiment according to the present invention, there is provided a method of forming a stiff fabric comprising the steps of coating a woven fabric with a latex compound in an amount of about 0.11–0.20 oz./sq. ft. (40 $g/m^2$–61.5 $g/m^2$) and curing the latex compound coated on the fabric in an oven at a temperature within a range of 250°–380° F. (121°–182° C.) to produce a stiff fabric.

Accordingly, it is a primary object of the present invention to provide a novel and improved stiff fabric and method of making the fabric useful for making, for example, vertical blinds, pleated shades for window treatments and wall covers or the like wherein the stiff fabric can be inexpensively and easily formed.

BRIEF DESCRIPTION OF THE DRAWINGS

FIG. 2 is a perspective view of a pleated shade employing the fabric hereof;

FIG. 3 is a schematic representation of a method of forming the stiff fabric hereof;

DETAILED DESCRIPTION OF THE DRAWINGS

Figure 1:
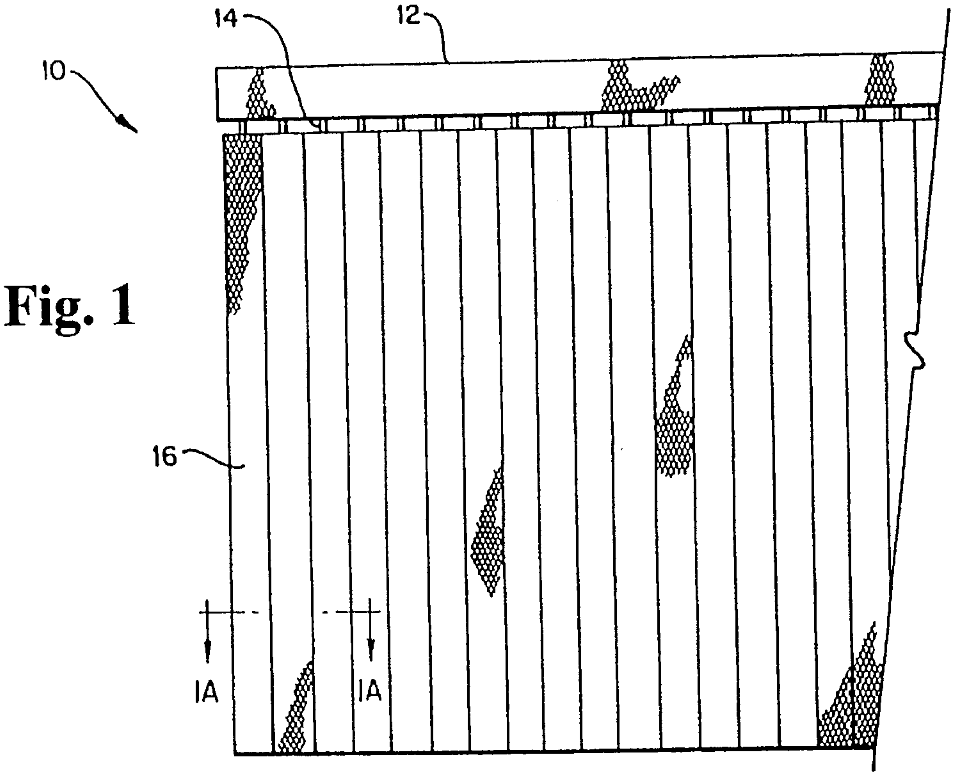
FIG. 1 is a fragmentary elevational view of vertical blinds formed of a fabric constructed in accordance with the present invention.

For clarity, FIGS. 1 and 2 illustrate representative examples of products in which the stiff fabric of the present invention may be embodied, the three products illustrated being vertical slats for blinds, pleated vertical blinds and pleated shades.

Figure 1A:
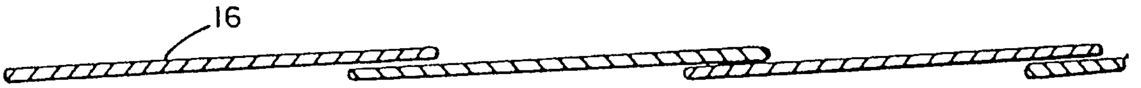
FIG. 1A is a fragmentary enlarged cross-sectional view thereof taken generally about on lines 1A—1A in FIG. 1.

Referring to FIG. 1, there is illustrated a vertical blind, generally designated 10, comprising a housing 12 for movably supporting, by means of pins 14, a plurality of vertically disposed slats or vanes 16, hereafter referred to as slats 16. The housing 12 contains a conventional track and mechanisms for displacing the blinds horizontally and rotating slats 16 about vertical axes. The slats 16 are formed of a stiff fabric constructed in accordance with the present invention and which slats each have a self-sustaining, self-supporting shape unaffected by environmentally anticipated heat and humidity. Thus, the elongate shape of the slat, whether it is flat as shown in FIG. 1A or cup-shaped, is maintained by the fabric itself.

Figure 1B:
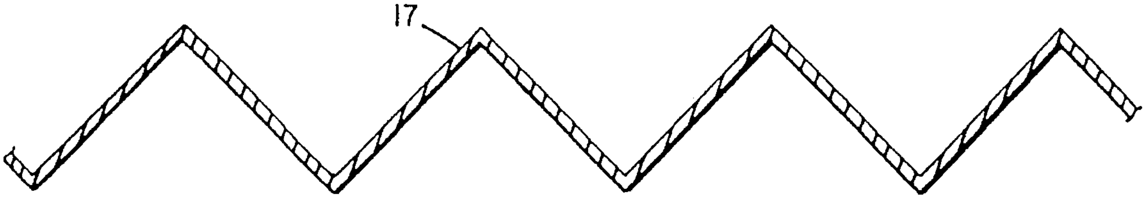
FIG. 1B is a view similar to FIG. 1A but illustrating use of the stiff fabric composite hereof in pleated blinds.

In FIG. 1B, there is illustrated a pleated vertical blind. Here, the blind is comprised of an elongated sheet of the stiff fabric, folded about horizontally spaced foldlines to provide an accordion effect in a horizontal direction. Again, the mechanisms for extending and retracting the vertically pleated blinds of FIG. 1B are not shown and are conventional.

Referring now to FIG. 2, there is illustrated a pleated shade 20 for a window treatment. Shade 20 comprises a stiff fabric of the present invention folded at vertically spaced positions along horizontal foldlines such that the pleated shade can be raised and lowered by mechanisms conventional in the prior art. It will be appreciated that in these embodiments, the fabric per se maintains a stiffness as a result of the treatment of the fabric, as described hereinafter, and without ancillary stiff supporting elements or substrates.

In a preferred form of the present invention, a synthetic fabric relatively tightly woven in a pattern and made, for example, of 100% polyester yarns, forms the basis for the stiff fabric hereof. For example, a fabric consisting of 150 denier, 48 filament polyester warp yarns, usually slasher dyed, and filling yarns ranging from a 10/1 (ten singles, cotton count) polyester to a two-ply 150/33 continuous filament polyester textured yarn, have been used. In continuous filament yarns, the first number represents the denier of the yarn and the second number represents the number of filaments per yarn. A filling pick range for the woven fabric may lie between 20 to 40 picks or weft threads per inch (8 to 16 picks per cm.). Preferably, the fabric has about 26 to 30 picks per inch (10.2 to 11.8 picks per cm.). The filling yarn count range (cotton count) may vary between 5/1 to 25/1 and could be single or two-ply polyester staple fiber yarns. The weight of the foregoing untreated fabric is 0.497 lbs./90 inches wide for a linear yard of material (108.7 g/m$^2$) and the weight range could be from 0.400 to 0.650 lbs./90 inches wide for a linear yard of the material (87.5 g/m$^2$ to 142 g/m$^2$).

The fabric is coated on one side with a known latex finishing compound C. This compound is preferably an acrylic emulsion blended from a desirable amount of inorganic filler and a curable resin affording a firm and stiff hand which, for a heavier application and different processing speeds, as here, provides a level of stiffness sufficient for use in vertical blinds and other types of window treatments. The preferred coating compound may comprise one known as Hipofoam BMT-26-B, manufactured by High Point Chemical Company, High Point, N.C., or Parachem TFS-606, manufactured by the Parachem Chemical Company, Simpsonville, S.C.

Referring now to FIGS. 3, 4A and 4B and 5, the manner of application of the coating to the woven synthetic fabric and the placement of the foam will now be described. The latex compound, which is supplied in liquid form, is supplied to a blender 22. Air is also supplied to the blender at a controlled rate to aerate or foam the latex compound in the blender 22. The air is controlled at a rate and in a quantity such that the aerated or foamed compound provided to the coater 24 has a weight of between 0.63–0.89 gms./ml. and preferably about 0.80 gms./ml. The coating C is applied to the fabric web W by the coater 24 at a rate sufficient to apply between 2.5 to 4.5 oz./lin. yd. for a 90-inch width web (34.1 to 61.5 gm/m$^2$). The coating is applied at a web speed between 25–40 yds./min. (22.8–36.6 m/min.), preferably at 30 yds./min. (27.4 m/min.).

Figure 4A:
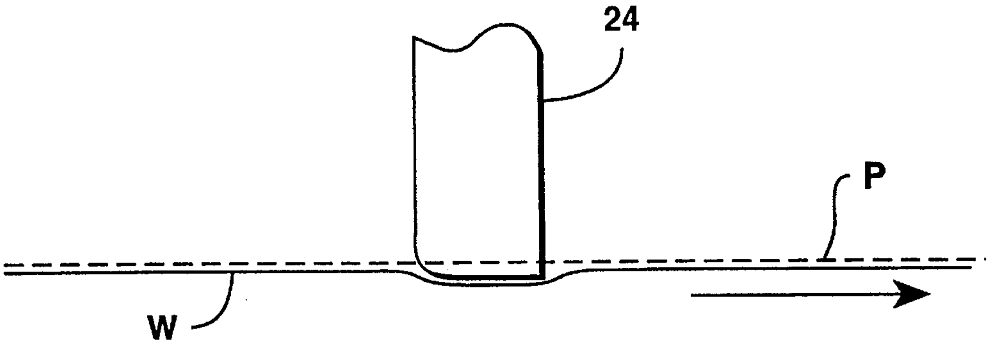
FIG. 4A is an enlarged view illustrating the shape and position of the blade relative to the fabric web when applying the compound to the web according to the present invention.
Figure 4B:
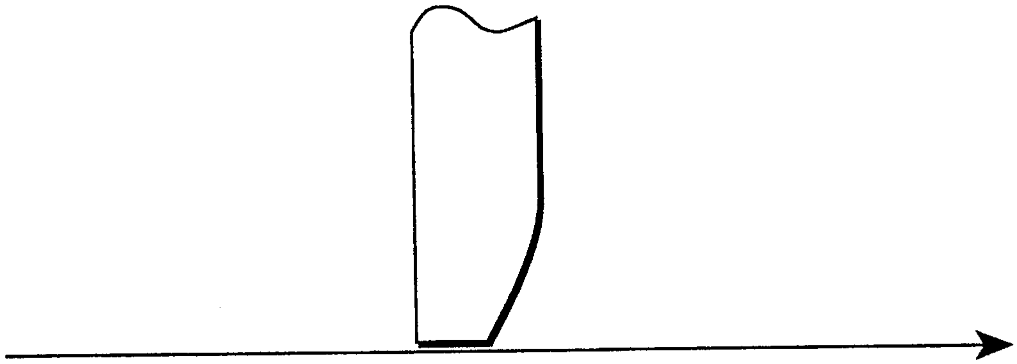
FIG. 4B is a view similar to FIG. 4A illustrating a blade of incorrect shape and location for applying the compound hereof to the web.

As best illustrated in FIG. 4A, a blade 24 having a rounded convex lower edge is used for pressing the coating into the fabric, i.e., the interstices of the fabric. It has been found that a knife edge having a square edge such as shown in FIG. 4B is insufficient to provide a coating resulting in a stiff fabric. As best surmised, a square edge scrapes the coating from the fabric, leaving compound on top of the fabric rather than penetrating into the interstices of the fabric. In accordance with the present invention, it has been found that a blade having a rounded convex lower edge positioned within a range of 0.02 to –0.06 inch (0.05 to –0.15 cm.) relative to a horizontal plane P passing through the web and preferably at an elevation of about –0.042 inch (–0.11 cm.) relative to the web (plane P) is sufficient to press the compound into the interstices sufficiently to form a stiff fabric but without coating on the opposite face side of the fabric. Thus, the coating is pressed into the back side of the woven fabric web W and into the interstices, while the face side of the fabric remains substantially clear of the coating.

The coated fabric passes downstream from blade 24 into an oven 26 for curing the coating. Preferably, the temperature range within the oven lies between 250°–380° F. (121°–193° C.), with approximately 300° F. (149° C.) being the preferred temperature for curing the compound. The dwell time within the oven is approximately 45–60 seconds.

Figure 5:
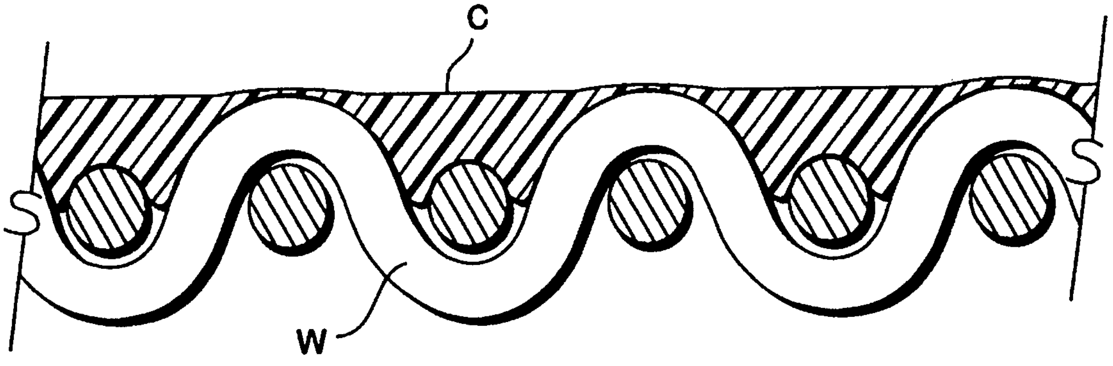
FIG. 5 is an enlarged cross-sectional view of the fabric with the coating applied thereto.

As illustrated in FIG. 5, the resulting stiff fabric does not have a smooth surface on its back side. Rather, the surface of the coating C along the backside of the fabric undulates very slightly, corresponding essentially to the woven fabric material. While the surface is essentially smooth to the touch, the warp and weft of the fabric can be felt through the coating.

A test has been conducted to measure the stiffness imparted to the fabric by the foregoing described fabric treatment. A flat piece of resulting coated synthetic fabric 3.5 inches (8.89 cm.) wide is cantilevered in a horizontal direction 5 inches (12.7 cm.) from a support. The droop of the fabric at its distal end lies within a range of 3–4 inches (7.62–10.16 cm.), with a droop of 3.75 inches (9.53 cm.) being the average of those droops measured.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stiff fabric comprising:

a woven fabric formed of synthetic material;

a latex curable compound applied to one side of said woven fabric and comprising an acrylic emulsion blended from an inorganic filler and a curable resin;

said latex compound being foamed with air when applied to said woven fabric and imparting a stiffness to said woven fabric, the weight of said foamed latex compound lying within a range of 0.63–0.89 gms/ml, and said latex compound being treated upon application to said woven fabric to provide said stiff fabric having a stiffness such that a flat piece of said stiff fabric 8.89 cm wide cantilevered in a horizontal direction 12.7 cm from a support has a droop at its distal end within a range of 7.6–10.2 cm.

2. A stiff fabric according to claim 1 wherein said compound has a weight of about 0.80 gms./ml.

3. A slat for a vertical blind formed of the stiff fabric of claim 1.

4. A blind for a window treatment formed of the stiff fabric of claim 1.

5. A pleated shade for a window treatment formed of the fabric of claim 1.

6. A stiff fabric according to claim 1 wherein said compound penetrates the interstices of said woven material from said one side and through said fabric, an opposite side of said fabric being substantially free of said compound.

7. A stiff fabric according to claim 1 wherein said fabric, uncoated, has a pick range between 8–16 picks per cm. and a weight range from 87.5 to 142 gms./m$^2$.

8. A method of forming a stiff fabric comprising the steps of coating a woven fabric with a latex compound in an amount of about 34.1–61.5 gms/m$^2$ and curing the latex compound coated on the woven fabric in an oven at a temperature within a range of 121°–193° C. to produce said stiff fabric;

wherein said woven fabric is formed of synthetic material;

wherein said latex curable compound is applied to one side of said woven fabric and comprises an acrylic emulsion blended from an inorganic filler and a curable resin; and wherein a flat piece of said stiff fabric 8.89 cm wide cantilevered in a horizontal direction 12.7 cm from a support has a droop at its distal end within a range of 7.6–10.2 cm.

9. A method according to claim 8 including, prior to coating the fabric, aerating the latex compound to a weight within a range of 0.63–0.89 gms./ml.

10. A method according to claim 8 including conveying a web of the woven fabric with the coating applied to one side of the fabric past a blade to press the coating into the interstices of the fabric.

11. A method according to claim 10 including providing a blade having a convex, rounded lower edge.

12. A method according to claim 10 wherein said web passes in a generally horizontal plane and the blade has a lower edge, disposing the blade within a range of 0.05 to –0.15 cm. relative to the horizontal plane.

13. A method according to claim 12 wherein the blade edge is set at about –0.011 cm. relative to the horizontal plane.

14. A slat for a vertical blind formed of the stiff fabric of claim 1 wherein said compound penetrates the interstices of said woven material from said one side and through said fabric, an opposite side of said fabric being substantially free of said compound, and wherein the opposite exposed sides of said slat comprise said woven fabric and said compound, respectively.

15. A blind for a window treatment formed of the stiff fabric of claim 1 wherein said compound penetrates the interstices of said woven material from said one side and through said fabric, an opposite side of said fabric being substantially free of said compound, and wherein the opposite exposed sides of said blind comprise said woven fabric and said compound, respectively.

16. A pleated shade for a window treatment formed of the stiff fabric of claim 1 wherein said compound penetrates the interstices of said woven material from said one side and through said fabric, an opposite side of said fabric being substantially free of said compound, and wherein the opposite exposed sides of said pleated shade comprise said woven fabric and said compound, respectively.

17. A stiff fabric according to claim 1 wherein said compound penetrates the interstices of said woven material from said one side and through said fabric, an opposite side of said fabric being substantially free of said compound, and wherein the opposite exposed sides of said stiff fabric comprise said woven fabric and said compound, respectively.

18. A slat for a vertical blind formed of the stiff fabric of claim 1, said slat being without additional supporting material imparting stiffness to the slat substantially throughout its length, said curable latex finishing compound lying along one side of said fabric with its opposite side remaining substantially free of said compound.

* * * * *